United States Patent [19]
Fukushima et al.

[11] Patent Number: 4,498,081
[45] Date of Patent: Feb. 5, 1985

[54] DISPLAY DEVICE FOR DISPLAYING BOTH VIDEO AND GRAPHIC OR CHARACTER IMAGES

[75] Inventors: Nobuo Fukushima; Noriyuki Tomimatsu, both of Nagasaki, Japan

[73] Assignee: Mitsubishi Denki Kabushiki Kaisha, Nagasaki, Japan

[21] Appl. No.: 287,757
[22] PCT Filed: Jul. 25, 1980
[86] PCT No.: PCT/JP80/00172
 § 371 Date: Jul. 20, 1981
 § 102(e) Date: Jul. 20, 1981
[87] PCT Pub. No.: WO82/00557
 PCT Pub. Date: Feb. 18, 1982
[51] Int. Cl.³ ............................................. G09G 3/12
[52] U.S. Cl. .................................. 340/793; 340/799; 340/781; 340/721; 358/153; 358/240
[58] Field of Search ............... 340/781, 793, 721, 703, 340/750, 798, 799, 800, 801; 358/240, 241, 153

[56] References Cited
U.S. PATENT DOCUMENTS 3,771,155  11/1973  Hayashi et al. ............. 340/750
3,827,042  7/1974   Mandzsu et al. ............ 340/793
4,021,607  5/1977   Amano ....................... 358/153
4,063,234  12/1977  Arn et al. .................. 340/793
4,193,095  3/1980   Mizushima .................. 340/781
4,243,987  1/1981   Bobick ....................... 340/801
4,297,693  10/1981  Parsons ...................... 340/721
4,367,464  1/1983   Kurahashi et al. ........... 340/793
4,379,292  4/1983   Minato et al. ............... 340/703

Primary Examiner—Marshall M. Curtis
Attorney, Agent, or Firm—Sughrue, Mion, Zinn, Macpeak and Seas

[57] ABSTRACT

A display device in which display elements 21 are arranged in matrix form to provide a screen, and pictures, characters and animations can be displayed while being edited as desired. The display device comprises: a video data memory 8; a graphic data memory 9; a blanking data memory 10 for blocking the output of the video data memory for every display element; and a video mode memory (11), a graphic mode memory (12) and a blanking mode memory (13) which block the outputs of the video data memory (8), the graphic data memory (9) and the blanking data memory (10), respectively, for each of a plurality of areas which collectively form the entire area of the display screen.

15 Claims, 1 Drawing Figure

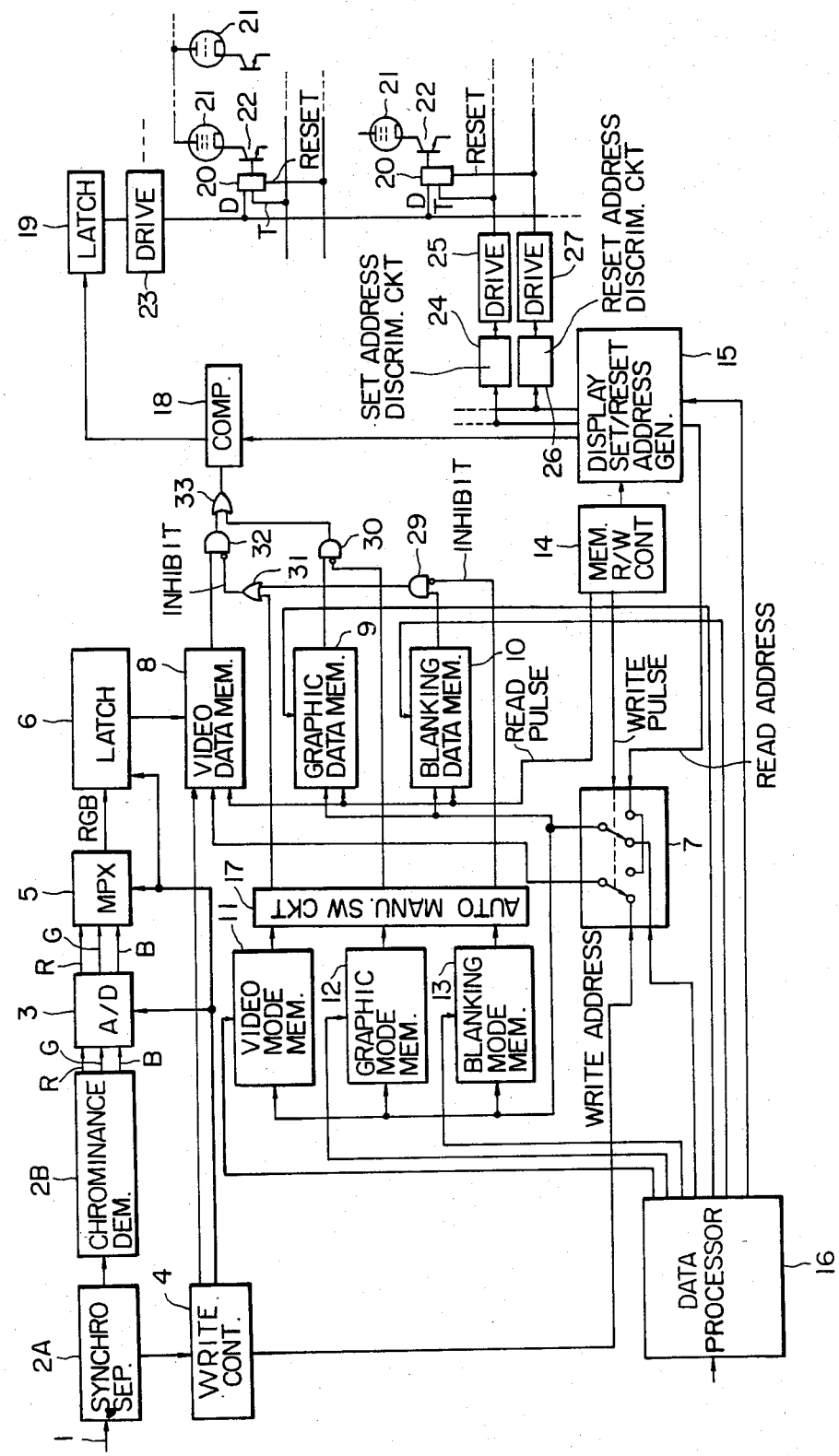

4,498,081

DISPLAY DEVICE FOR DISPLAYING BOTH VIDEO AND GRAPHIC OR CHARACTER IMAGES

TECHNICAL FIELD

This application is based on, and claims the benefit of, PCT International Application PCT/JP 80/00172, filed July 25, 1980.

This invention relates to a display device in which display elements are arranged in matrix form to provide an immense screen service, for instance, as the score board of a baseball field, and for motion pictures wherein graphic patterns such as characters and animations are displayed on the screen, as seen in television sets, while being edited on the screen as desired.

BACKGROUND ART

It is well known in the art that a display device having a screen provided by arranging incandescent lamps in matrix form may be used as the score board of a baseball field or a stadium or on an advertising pillar. In some display devices, pictures are displayed as seen in television sets. Also in some display devices, characters, messages and pictures are displayed in superposition. In this case, in general, in a conventional display device of this type, character data and a video signal are mixed to provide a composite video signal (including synchronizing signals), and the composite video signal is stored in a frame memory, and is then processed as required for display. Accordingly, the editing operation is troublesome, taking a lot of time.

SUMMARY OF THE INVENTION

In this invention, a video data memory for storing a video signal obtained from a composite video signal, as much as one frame of a display screen, and a graphic data memory for storing a graphic signal (including a character signal) as much as one frame of the display screen, which is displayed solely or in superposition on a picture are provided independently, so that the two signals are inputted or provided independently of each other in time relation, and accordingly in generation of graphic messages it is unnecessary to take the synchronization with the video signal into account.

Furthermore, for the video data memory and the graphic data memory, a video mode memory and a graphic mode memory are provided to control the operations of reading data out of the video data memory and the graphic data memory for each of display areas in suitable size which form the entire display screen, respectively. Therefore, the screen can be readily divided into picture display portions and graphic display portions.

In addition, a blanking memory having a capacity corresponding to one frame is provided which blanks the data reading operation of the video data memory or the graphic data memory for each of the display elements. Therefore, when a picture is superposed on graphs or characters, the readability of the graphs or characters can be improved, for instance, by blanking around the characters.

Thus, pictures, graphs and characters can be readily arranged and combined, or edited, on the display screen.

BRIEF DESCRIPTION OF THE DRAWING

The single FIGURE in the accompanying drawing is a block diagram showing one example of a display device according to this invention.

DETAILED DESCRIPTION OF THE PREFERRED EMBODIMENT

The single FIGURE is a block diagram showing one example of a display device according to this invention. In the FIGURE, reference character (1) designates a composite video signal in which a vertical synchronizing signal and a horizontal synchronizing signal in addition to a video signal are combined; that is, it is a signal from a broadcast station or VTR TV camera, (2A) a synchronizing separator circuit for separating the horizontal synchronizing signal, the vertical synchronizing signal, odd and even number status signals and the video signal from the composite video signal (1), (2B) a chrominance demodulator circuit for obtaining red, green and blue color signals from the separated video signal and delivering them in the form of analog signals in a parallel mode, (3) an A/D (analog-to-digital) converter for converting the color signals, i.e. the analog signals, into digital signals, (4) a write control circuit for producing in synchronization with the horizontal and vertical synchronizing signals from the synchronizing separator circuit (2A) a sampling pulse to the A/D converter, a selection pulse to a data multiplexer (5) (described later), a latch pulse to a data latch circuit (6), a write pulse to a video data memory (8) and a memory write address, (5) the data multiplexer which selects successively with the aid of the selection pulse provided by the write control circuit (4) the color signals which are outputted, in a parallel mode, by the A/D converter and outputs the color signals in a series mode as red, green, blue, red, green, blue and so on, (6) the data latch circuit for temporarily hold the output color signals of the data multiplexer (5) every period of the latch pulse provided by the write control circuit (4), (7) an address multiplexer which sends data to and receives data from various memories, (8) a video data memory having a plurality of bits the number of which corresponds to the total number of display elements which form a display screen, and having a capacity capable of storing the data of a frame of the display screen, (9) a graphic data memory having a storage capacity corresponding to the total number of display elements similarly as in the video data memory, and storing graphic or character data in predetermined addresses, and (10) a blanking data memory having a storage capacity corresponding to the total number of display elements similarly as in the video data memory (8) and masking video data from the video data memory for every display element.

Further in the FIGURE, reference numeral (11) designates a video mode memory. For instance, in the case where the number of display elements is 128×192 (vertical direction×horizontal direction), the entire screen is divided into 8×8 areas. The video mode memory can inhibit the reading of the video data from any area or combination of areas of the video data memory (8), for instance, for ⅛ of the lower part of the screen or ¼ of the right part of the screen. Reference numeral (12) designates a graphic mode memory which inhibits the reading of the graphic data from the graphic data memory (9) for each of the areas the number of which is equal to that in the case of the video mode memory (11) (the number of area may not be equal to). Reference numeral

(13) designates a blanking mode memory which inhibits the reading of the blanking data from the blanking data memory (10) for each of the areas the number of which is equal to that in the case of the video mode memory (11).

Reference numeral (14) designates a memory read and write controller. The memory read and write controller and the address multiplexer (7) form a memory controller. The memory read and write controller (14) applies to the address multiplexer (7) a write pulse for controlling the introduction of the write address, which has reached the address multiplexer (7) from the write control circuit (4), into the video data memory (8). Furthermore, the controller (14) applies a read pulse to the data memories (8), (9) and (10). The read pulse generating period and the write pulse generating period occur alternately, thus forming one sampling period. It is unnecessary to make the read pulse and the write pulse synchronous with each other.

Reference numeral (15) designates a display set and reset address generating circuit which produces X-axis addresses for set and reset flip-flops (20) on the X-axis of the display screen with the aid of a timing signal from the memory read and write controller (14), and simultaneously applies X-axis comparison brightness data to data comparators (20), whereby all Y-axis data are determined and the flip-flops on a particular X-axis are set by the set signal. The reset address signal is produced a predetermined period of time after the set address signal, and the time interval therebetween can be controlled by brightness codes, to determine the maximum brightness of the entire screen. That is, the time interval is set at a maximum to obtain the maximum brightness; in other words, in this case, the reset pulse is eliminated.

Reference numeral (16) designates a data processor for specifying addresses in the memories other than the video memory to write data therein. In the data processor (16), the writing timing is equal to the writing timing of the video memory. In addition, the data processor (16) supplies for instance thirty-two different reference brightness codes to the display set and reset address generating circuit (15). Reference numeral (17) designates an automatic manual switching circuit. When data are read out of the video memory (8), the signal of the video mode memory (11) is also read out with the same timing so that it is applied through an OR circuit (31) to the inhibit terminal of an AND circuit (32). Therefore, the signal of the video data memory (8) corresponding to the area which has been set for the video mode memory (11) by the data processor (16) is blocked. When data are read out of the graphic data memory (9), the signal of the graphic mode memory (12) is also read out similarly so that it is applied to the inhibit terminal of an AND circuit (30), and the signal of the graphic memory corresponding to the area which as been set for the graphic mode memory is blocked. Similarly as in the above-described case, when data are read out of the blanking data memory (10), data are read out of the blanking mode memory simultaneously, and the signal of the blanking data memory corresponding to the area which has been set for the blanking mode memory (13) is blocked. In the case when the operation mode of the automatic-manual switching circuit (17) is switched to a manual operation mode, the signals of the mode memories (11), (12) and (13) can be individually turned on and off. When they are turned on, the video signal, the graphic signal and the blanking signal with respect to the entire screen can be blocked, respectively. Reference numeral (18) designates a data comparator in which the data of each of the memories (8), (9) and (10) is compared with the 5-bit reference brightness code which is delivered in thirty-two steps from the display set and reset address generating circuit (15). When they coincide with each other or the data brightness signal is larger, the brightness signal is converted into a binary signal having a pulse width of thirty-two steps which is used to set the on or off state of the relevant display element. Reference numeral (19) designates a data latch circuit for temporarily holding a comparison result data. Reference numeral (20) designate D-type flip-flops. Reference numerals (21) designate display element cathode ray tubes which emit red, blue and green lights individually. These cathode ray tubes are arranged regularly in matrix form as red, green and blue, thus forming the display screen. Reference numerals (22) designate transistors which drive the cathode ray tubes in response to signals from the flip-flops (20). Reference numeral (23) designates a drive circuit, which in response to an X-axis address signal and a brightness signal from the data latch circuit (19) applies a signal to the data input terminals D of the flip-flops connected to the cathode ray tubes (21) in the direction of column specified by the address signal. In this operation, a set pulse described below is applied to the set input terminals T of the flip-flops. The set pulse signal and an address signal is produced by the display set and reset address generating circuit (15), and the set signal is received by a set address discriminating circuit (24) corresponding to the address, as a result of which the set pulse signal from a drive circuit (25) in that line is applied to the terminals T of the flip-flops coupled to the cathode ray tubes in that line, and the states of the terminals D obtained whenever the set pulse signal is applied are outputted by the flip-flops. Reference numerals (26) designate reset address discriminating circuits. The reset address discriminating circuits (26) receive the address signal and the reset signal from the display set and reset address generating circuit (15). A reset address discriminating circuit (26) corresponding to the address signal causes a drive circuit (27) in that line to apply the reset pulse to the reset terminals of the flip-flops to reset the latter.

The signal writing operation, the signal reading operation and the display operation of the display device will be now described.

Signal Writing Operation

First, the composite video signal (1) is applied to the synchronizing separator circuit (2A). The video signal is an analog signal, and it is inputted while being monitored by a monitor.

The synchronizing separator circuit (2A) separates the horizontal synchronizing signal H and the vertical synchronizing signal V from the composite video signal (1) and inputs them to the write circuit (4). The chrominance demodulator circuit (2B) outputs the color signals including information of the lightness and darkness of the image, i.e. the brightness of the image, separately according to red, green and blue. The color signals are applied, in the form of analog signals, to the A/D converter (3).

Digital signals corresponding to the separate brightness signals for each of the colors are outputted from the A/D converter (3).

Upon receiving the digital signals, the data multiplexer (5) selects the digital signals successively according to the arrangement in color of the cathode ray tubes (21) on the display board. The digital signal thus selected is applied as the write data to the data latch circuit (6) as it is, in which it is latched temporarily until the timing of writing data into the video memory (8) occurrs.

On the other hand, the write control circuit (4) forms according to the synchronizing signals a signal for specifying an address in the video data memory (8), i.e. a memory write address signal and applies it to the address multiplexer (7). The address multiplexer (7), receiving a signal from the memory read and write controller (14) adapted to set the time sharing of the write period and the read period of each memory, operates to apply the memory write address signal to the video data memory only during the write period, thereby to store the latched write data in a desired address.

The video data memory (8) comprises a RAM (random access memory) having memory elements the number of which corresponds to the cathode ray tubes (21) arranged in a matrix form of 128 (in verticaly direction)×192 (in horizontal direction) on the display board, and the data are written in positions corresponding to the respective memory write address signals.

Similarly, characters or graphs are displayed with the aid of the graphic data memory (9) in correspondence to the video data memory (8), and characters or the like are displayed by blanking the video signal from the video data memory (8) with the blanking data memory (10).

On the other hand, only a particular region of the display board is controlled with the video mode memory (11), the graphic mode memory (12) and the blanking mode memory (13), so that, in certain areas in the particular region, the video data memory (8), the graphic data memory (9) or the blanking data memory (1) are blocked.

In the memories (9), (10), (11), (12) and (13) other than the video data memory (8), addresses are specified externally as desired by the data processor (16) and data are written therein with the same timing as that employed for the video data memory (8).

Signal Reading Operation

The display set and reset address generating circuit (15) receives the timing signal from the memory read and write controller (14), to provide a memory reading address signal, which is applied to the address multiplexer (7).

The address multiplexer (7) receives the timing signal from the memory read and write controller (14), to open its gate for a predetermined period of time. In this operation, the memory reading address signal is applied to the video data memory (8), as a result of which the reading is carried out.

The reading address signal addresses all the memory elements in the video data memory (8), to read all the signals stored therein.

In reading the signals of the graphic data memory (9) and the blanking data memory (10), similarly as in the above-described case, a reading address signal for each memory is applied to the address multiplexer for a predetermined period of time.

Display Operation (1) Video Signal Display

In synchronization with the timing signal from the memory read and write controller (14), the display set and reset address generating circuit (15) supplies a cathode ray tube (21) "on" discriminating comparison data to the data comparator (18).

In the data comparator (18), the read data is compared with the comparison data in steps successively, so that "on" and "off" signals are outputted according to the levels of the read signals.

The signals thus outputted are applied through the data latch circuit (19) to the drive circuit (23) to control the brightnesses of the light tubes. More specifically, the D-type flip-flop is coupled to the cathode of each light tube, and the output of the drive circuit (23) is applied, as a data input, to the D-type flip-flop. The flip-flop is set by the above-described set address signal, to turn on and off the light tube.

The set address signal is applied, as a timing signal, to the flip-flop (20) connected to each cathode ray tube (21), and the reset address signal is applied, as a reset signal, to the same flip-flop (20).

If the time interval between the generation of the set address signal and the generation of the reset address signal is constant, then the brightness of each cathode ray tube (21) corresponds to the signal supplied from the data comparator (18). Therefore, the brightness of each cathode ray tube (21), i.e. the brightness of the entire screen on the display board can be controlled by changing the time interval between the generations of the two signals.

(2) Graphic Signal Display

The graphic signal (including a character signal) read out of the graphic data memory (9) is superposed on the video signal through the OR circuit (33). Therefore, the graph is displayed on the screen. Since the brightness of the graphic signal is set to the maximum value of the video signal, no trouble is caused even if both of the signals are superposed.

(3) Display of Blanking Video Signal

The signal read out of the blanking data memory (10) is applied to the inhibit terminal of the AND circuit (32), so that the video signal is blanked in correspondence to the blanking signal. In this case, the display is made by turning off the cathode ray tubes (21).

(4) Display of Controlling Particular Area

In order to block the video display, the graphic display and the blanking display in a particular area of the screen, signals for specifying an area to be blocked are written in the video mode memory (11), the graphic mode memory (12) and the blanking mode memory (13), respectively. The writing timing and addressing are similar to those in the case where the writing operations are carried out for the video data memory (8), the graphic data memory (9) and the blanking data memory (10).

If the automatic-manual switching circuit (17) is switched to "automatic", when the signal is read out of the video data memory (8), the signal is read out of the video mode memory with the same timing, so as to be applied to the inhibit terminal of the AND circuit (32). Therefore, the signal of the video data memory (8) which corresponds to the area specified in the video mode memory (11) is blocked.

When the signal of the graphic data memory (9) is read, the signal of the graphic mode memory (9) is also read. The two signals are applied to AND circuit regular and inhibit terminal inputs. Therefore, the signal of the graphic data memory (9) which corresponds to the area specified in the graphic mode memory (12) is blocked.

Similarly as in the above-described cases, both the signals of the blanking mode memory (13) and the blanking data memory (10) are applied as inputs to the circuit (29). Therefore, the signal of the blanking data memory (10) which corresponds to the area specified in the blanking mode memory (13) is blocked.

If the automatic-manual switching circuit (17) is switched to "manual", the signals of the mode memories can be individually turned on and off. In the case when the signals are turned on, the signals of the video, graphic and blanking mode memories for the entire screen are blocked.

Industrial Applicability

It is most suitable that this invention is applied to an immense display device such as the score board of a baseball field, or a display board in a stadium, or on an advertising pillar; however, it can be applied to a small display device such as an ordinary television set.

We claim:

1. A display device for displaying pictures and graphs on a display board in which a number of display elements are arranged in matrix form, CHARACTERIZED in that said device comprises: a synchronizing separator circuit for separating a composite video signal including synchronizing signals into said synchronizing signals and a video signal of a brightness signal and/or color signals; an analog-to-digital (A/D) converter for converting said video signal into a digital signal; a video data memory for storing said video digital signal provided by said A/D converter, in accordance with said synchronizing signals; a blanking data memory for storing data blocking an output of said video data memory for every display unit; a graphic data memory for storing characters and graphs; a video mode memory, a graphic mode memory and a blanking mode memory for respectively storing data blocking outputs of said video data memory, blanking data memory and graphic data memory for each of a plurality of areas which form the entire area of said display board; a memory controller for controlling the read and write operations of said video data memory, blanking data memory, graphic data memory, video mode memory, graphic mode memory and blanking mode memory; a comparator in which a reference brightness signal in response to a pulse width modulation signal reading timing according to data in each memory is compared with the brightness of a data signal delivered out of each memory and said data signal is modulated into a pulse width modulation signal; and a drive circuit for receiving said pulse width modulation signal, to drive a flip-flop provided for every display unit, so that pictures, characters and graphs are displayed as desired on said display screen.

2. A display device for receiving a composite video signal including synchronizing signals and a video signal portion representing a first image and for displaying at least one of said first image and a second image on a display screen formed by a matrix of display elements, said display device comprising:
signal processing means for receiving said composite video signal and generating video data corresponding to said first image represented by said video signal portion;
a first memory for storing said video data;
a second memory for storing further data corresponding to said second image;
reading means for reading said video and further data out of said first and second memories as first and second memory outputs, respectively;
combining means for combining said first and second memory outputs into a combined display signal; and
illuminating means for illuminating said display elements in accordance with said combined display signal.

3. A display device as claimed in claim 2, further comprising:
a third memory for storing blanking data representing portions of said video data to be inhibited;
means for reading said blanking data out of said third memory as a third memory output; and
inhibiting means responsive to said third memory output for inhibiting said first memory output.

4. A display device as claimed in claim 2, wherein said display screen comprises a plurality of display screen portions each including a plurality of display elements, said device further comprising:
a first mode memory for storing first mode data representing regions of said display screen in which the display of said video data is to be inhibited;
a second mode memory for storing second mode data representing regions of said display screen in which the display of said further data is to be inhibited;
means for reading the data out of said first and second mode memories; and
means for inhibiting the output of said first and second memories in accordance with the data read out of said first and second mode memories.

5. A display device as claimed in claim 3, wherein said display screen comprises a plurality of display screen portions each including a plurality of display elements, said device further comprising:
a first mode memory for storing first mode data representing regions of said display screen in which the effect of said video data is to be inhibited;
a second mode memory for storing second mode data representing regions of said display screen in which the effect of said further data is to be inhibited;
a third mode memory for storing third mode data representing regions of said display screen in which the effect of said blanking data is to be inhibited;
means for reading the data out of said first, second and third mode memories; and
means for inhibiting the output of said first, second and third memories in accordance with the data read out of said first, second and third mode memories.

6. A display device as claimed in claim 5, wherein said inhibiting means responsive to said third memory output for inhibiting said first memory output and said means responsive to said first, second and third mode memory outputs for inhibiting the outputs of said first, second and third memories collectively comprise:
a first inhibiting circuit receiving as inputs the outputs of said third memory and said third mode memory and passing or inhibiting said third memory output in accordance with said third mode memory output;
a second inhibiting circuit receiving as inputs the outputs of said second memory and said second mode memory and passing or inhibiting the output of said second memory in accordance with said second mode memory output;

an OR gate receiving as inputs the outputs of said first inhibiting circuit and said third mode memory; and a third inhibiting circuit receiving as inputs the outputs of said first memory and said OR gate and passing or inhibiting the output of said first memory in accordance with the output of said OR gate.

7. A display device as claimed in claim 6, wherein said combining means comprises a second OR gate for receiving and combining the outputs of said second and third inhibiting circuits.

8. A display device as claimed in claim 2, wherein said illuminating means comprises:

means for generating a reference signal corresponding to a reference brightness;

means for comparing said combined display signal to said reference signal; and driving means for driving said display elements in accordance with said comparison means output.

9. A display device as claimed in claim 8, wherein said driving means comprises:

a plurality of flip-flops;

means for energizing each of said display elements in accordance with the output of a respective one of said flip-flops;

means for setting said flip-flops at a first predetermined time in accordance with said comparison means output;

means for resetting said flip-flops at a second predetermined time; and means for controlling the time interval between said first and second predetermined times to thereby control the overall brightness of said display screen.

10. A display device as claimed in claim 3, wherein said illuminating means comprises:

means for generating a reference signal corresponding to a reference brightness;

means for comparing said combined display signal to said reference signal; and driving means for driving said display elements in accordance with said comparison means output.

11. A display device as claimed in claim 10, wherein said driving means comprises:

a plurality of flip-flops;

means for energizing each of said display elements in accordance with the output of a respective one of said flip-flops;

means for setting said flip-flops at a first predetermined time in accordance with said comparison means output;

means for resetting said flip-flops at a second predetermined time; and means for controlling the time interval between said first and second predetermined times to thereby control the overall brightness of said display screen.

12. A display device as claimed in claim 4, wherein said illuminating means comprises:

means for generating a reference signal corresponding to a reference brightness;

means for comparing said combined display signal to said reference signal; and driving means for driving said display elements in accordance with said comparison means output.

13. A display device as claimed in claim 12, wherein said driving means comprises:

a plurality of flip-flops;

means for energizing each of said display elements in accordance with the output of a respective one of said flip-flops;

means for setting said flip-flops at a first predetermined time in accordance with said comparison means output;

means for resetting said flip-flops at a second predetermined time; and means for controlling the time interval between said first and second predetermined times to thereby control the overall brightness of said display screen.

14. A display device as claimed in claim 2, wherein said signal processing means comprises:

a synchronizing separator circuit for separating said composite video signal into said synchronizing signals and said video signal portion, said video signal portion representing a brightness signal and/or color signals; and an analog-to-digital (A/D) converter for converting said video signal portion into a digital signal, and digital signal being stored in said first memory as said video data.

15. A display device as claimed in claim 14, wherein said second image comprises characters and/or graphs.

* * * * *

UNITED STATES PATENT AND TRADEMARK OFFICE
CERTIFICATE OF CORRECTION

PATENT NO. : 4,498,081

DATED : February 5, 1985

INVENTOR(S) : Nobuo Fukushima, et al.

It is certified that error appears in the above-identified patent and that said Letters Patent is hereby corrected as shown below:

On the front page of the Patent at Item (73) change "Nagasaki" to --Tokyo--.

Signed and Sealed this

Second Day of July 1985

[SEAL]

Attest:

DONALD J. QUIGG

Attesting Officer     Acting Commissioner of Patents and Trademarks